United States Patent [19]

McGuffin et al.

[11] 3,922,593

[45] Nov. 25, 1975

[54] CIRCUIT FOR PRODUCING ODD FREQUENCY MULTIPLE OF AN INPUT SIGNAL

[75] Inventors: William George McGuffin, Willingboro; Robert Walter Burgen, East Windsor, both of N.J.

[73] Assignee: RCA Corporation, New York, N.Y.

[22] Filed: Nov. 4, 1974

[21] Appl. No.: 520,793

[52] U.S. Cl. .................... 321/4; 307/220 R; 321/60; 328/31; 328/140

[51] Int. Cl.² .................... H02M 5/40

[58] Field of Search .......... 321/4, 6, 60, 61, 65, 69; 328/15, 26, 28, 31, 32, 140; 307/220 R, 216

[56] References Cited

UNITED STATES PATENTS

| | | | |
|---|---|---|---|
| 3,143,708 | 8/1964 | Richman | 328/26 |
| 3,564,389 | 2/1971 | Richman | 321/6 |
| 3,659,208 | 4/1972 | Fussell | 328/31 |
| 3,798,529 | 3/1974 | Jones | 321/60 X |
| 3,840,798 | 10/1974 | Burchall et al. | 321/4 X |

*Primary Examiner*—Gerald Goldberg
*Attorney, Agent, or Firm*—H. Christoffersen; Samuel Cohen; Frank R. Perillo

[57] ABSTRACT

A circuit for producing an output signal whose frequency is an odd multiple of that of the input signal which may be of variable frequency. The input signal is translated to an asymmetrical output wave at twice the input frequency. One third of each period of the wave is of one sense and occurs at the peaks of given polarity of the input signal and the remaining two thirds is of opposite sense. This wave and a second wave, the latter at the same frequency as the input signal, are applied to an EXCLUSIVE OR gate to provide an output signal at triple the input signal frequency. Similar techniques may be employed to obtain higher odd frequency multiples of the input frequency.

13 Claims, 6 Drawing Figures

CIRCUIT FOR PRODUCING ODD FREQUENCY MULTIPLE OF AN INPUT SIGNAL

Figure 1:
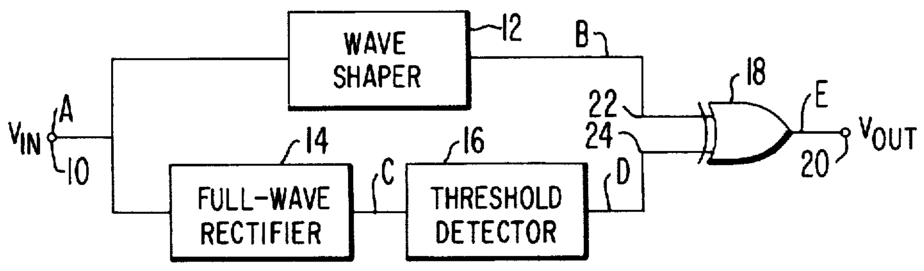

It is often desirable to increase the frequency of a signal. For example, if the signal is a frequency modulated (FM) wave, and the frequency of the signal is increased by multiplication, there will be a corresponding increase in the FM bandwidth occupied by the signal. Such an increase can result in a significant improvement in the post detection signal-to-noise ratio of the signal compared to an AM or narrow band FM signal at a given power level. Of course, this improved signal-to-noise ratio is at the expense of requiring added bandwidth for the transmission. However, if such bandwidth is available, the technique of bandwidth expansion may be used to achieve a given signal-to-noise ratio with reduced transmitter power requirements.

While a great many techniques exist for frequency multiplying, most of them have a severe shortcoming when the frequency of the signal to be multiplied is varying, as it would be with an FM wave. Generally, analog frequency multipliers require a tuned circuit to achieve multiplication. Such a tuned circuit may be used as a filter to select the desired harmonic from the frequency spectrum of the multiplier output. If the frequency of the signal applied to the multiplier input is varying, the required output filter may be quite complex, especially when low distortion transmission is required. For example, an electronically tuned filter whose center frequency is varied to track variations in the input frequency may be required.

The prior art also discloses applications where tuned circuits are used to phase shift the signal to be frequency multiplied. For example, first and second phase shift networks may provide ±45° phase shift of the input signal. If these two phase shifted signals are then converted to square waves and applied to an EXCLUSIVE OR gate, the output of the gate will be at a frequency that is twice that of the signal applied to the phase shift networks. Such an approach is satisfactory over a relatively narrow range of frequencies and the concept may be extended to realize higher order frequency multipliers. However, this approach is inadequate where the frequency of the input signal is subject to large variations because the phase shift provided by each network would no longer be constant.

Frequency multiplication of signals whose frequency is varying is possible using phase-locked loop multipliers but these circuits are generally quite complex, and in wide band systems, it is extremely difficult to maintain delay distortion within acceptable limits.

In the circuits of the present invention, an input alternating signal whose frequency may be variable is translated to an output signal having a frequency N times that of the input signal where N is an odd integer. A symmetrical wave having a frequency equal to the frequency of the input signal and a value at either of two voltage levels is derived from the input signal. Also derived are one or more asymmetrical waves having double the frequency of the input signal and an amplitude at a first level during the smaller fraction of each cycle and a second level during the larger fraction of each cycle. The number of asymmetrical waves derived and the degree of their asymmetry depends on the desired multiple N where the number required equals (N−1)/2. The asymmetrical and symmetrical waves are applied to a logic circuit which has an output at a first level when an even number of its inputs is at a first voltage level and at a second level when an odd number of its inputs is at a first voltage level. The output of the logic gate will be at the desired frequency.

Figure 2:
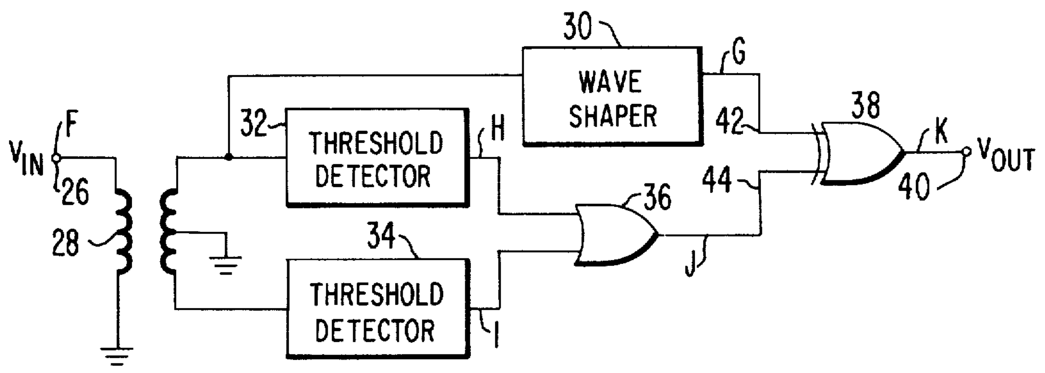
Figure 3:
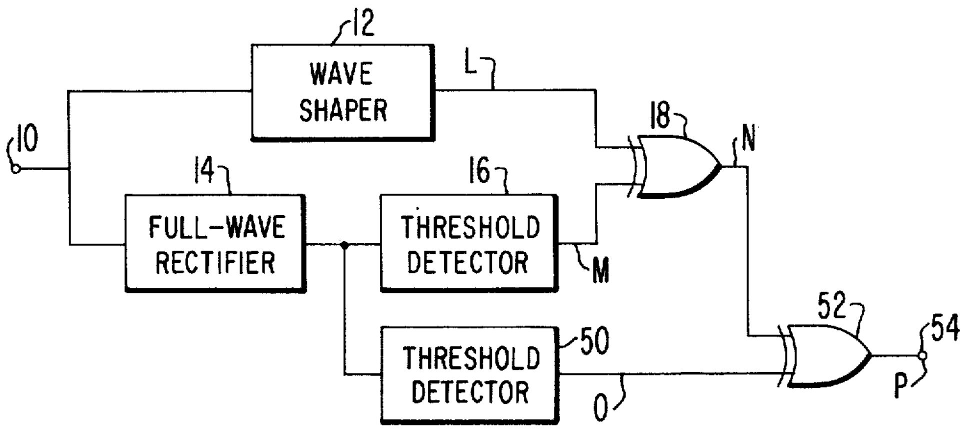
Figure 4:
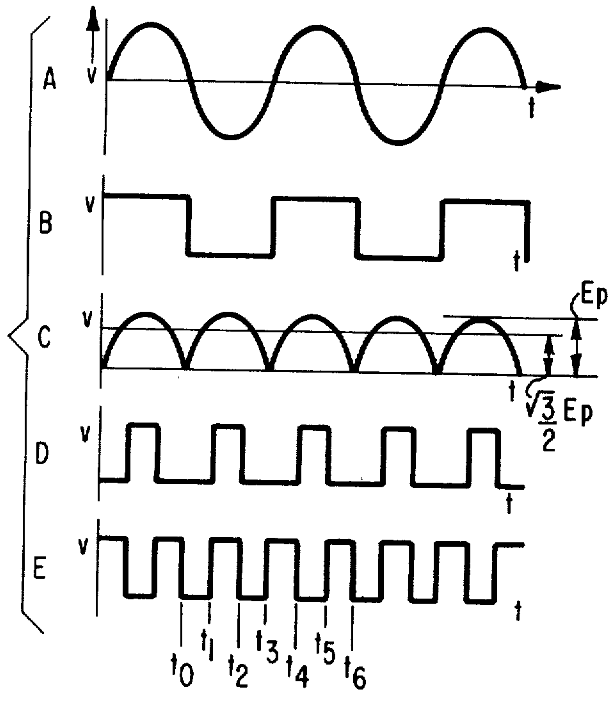
Figure 5:
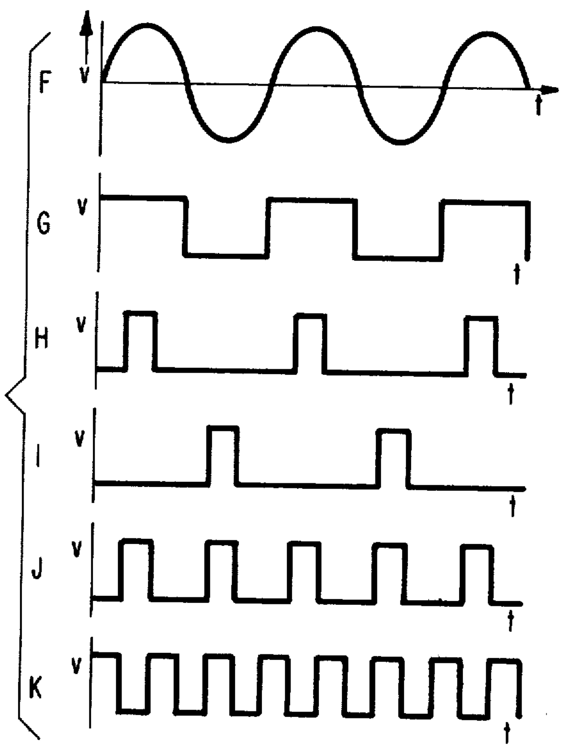
Figure 6:
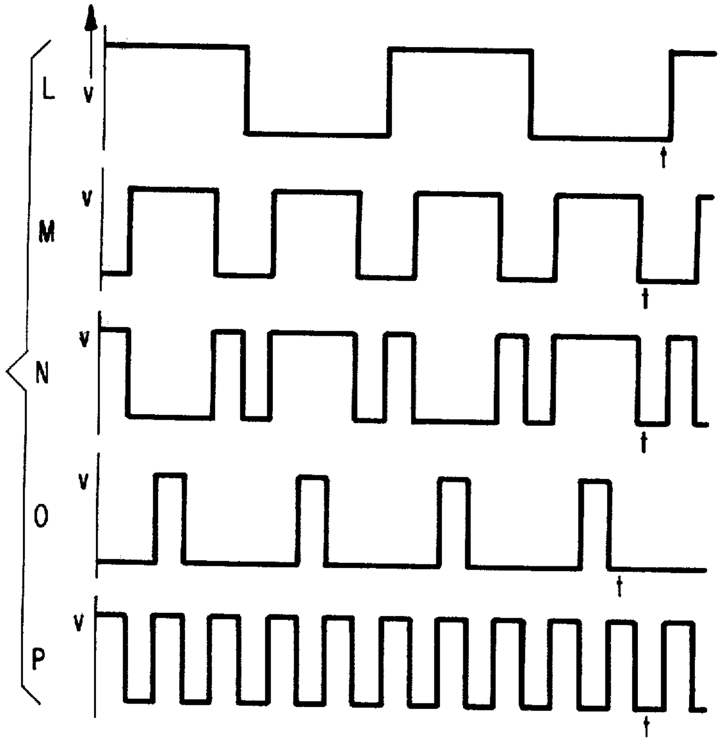

In the drawing:

FIGS. 1, 2 and 3 are block diagrams of three different embodiments of the invention; and FIGS. 4, 5 and 6 show waveforms present in the circuits of FIGS. 1, 2 and 3, respectively.

In FIG. 1, input terminal 10 is common to the wave shaper 12 and the full wave rectifier 14. The full wave rectifier connects to threshold detector 16. The wave shaper and the threshold detector connect to the respective input terminals of EXCLUSIVE OR gate 18. The signal output terminal 20 is the output of the EXCLUSIVE OR gate.

In the operation of the circuit of FIG. 1, a sinusoidal signal, shown at A of FIG. 4, of essentially constant amplitude but which may be varying in frequency, is applied to input terminal 10. This signal is converted to a square wave by wave shaper 12 as shown at B of FIG. 4. This square wave is at one binary value, representing a 1 during the half period the sinusoid is positive and at the other binary value, representing a 0, during the half period the sinusoid is negative. The wave shaper may be a Schmitt trigger circuit or a high gain limiting amplifier. The input signal is also applied to full wave rectifier 14 where it is rectified as shown at C of FIG. 4. The output of the rectifier circuit is applied to threshold detector 16. This detector may be a Schmitt trigger or a high gain limiting amplifier, each having an adjustable threshold. The value of the threshold is a fixed voltage whose value is $\sqrt{3}/2$ times the peak value of the rectified sine wave.

For each half cycle of the rectified wave, the threshold detector has an output that is low (represents a 0) until the signal reaches the threshold value. At this point the output of the detector becomes high (represents a 1) and remains high until the instantaneous value of the rectified wave drops below the threshold voltage, at which point the detector output drops to a low voltage. The detector output, shown at D of FIG. 4, is a pulse train whose frequency is twice the frequency of the sine wave, applied at the input of the circuit. The width of each pulse equals one-third the width of each rectified half cycle and each pulse is centered about the peaks of the rectified wave.

The outputs of the wave shaper 12 and threshold detector 16 are applied to inputs 22 and 24, respectively, of EXCLUSIVE OR gate 18. As is understood in the art, this gate produces an output representing a 1 when one input represents a 1 and the other a 0, and an output representing a 0, when both inputs represent the same binary value—either 1, 1 or 0, 0. The output signal of this gate is shown at E of FIG. 4. It is a signal that is three times the frequency of the signal applied at terminal 10. Logic gate 18 could instead be an EXCLUSIVE NOR gate. If the threshold voltage of detector 16 was set to a value other than $\sqrt{3}/2$ times the peak value of the rectified wave, frequency multiplication would still occur but the output signal would not have the 50 percent duty cycle shown at E.

The frequency multiplication process can be described with reference to FIG. 4. During the interval $t_0$ to $t_1$, the signals at terminals 22 and 24 are both low representing binary 0 and the output of the EXCLUSIVE OR gate is also low. During the interval $t_1$ to $t_2$, the signal D at terminal 24 is high representing binary 1 and the signal B at terminal 22 is low causing the signal at output terminal 20 to be high. During the interval $t_2$ to $t_3$, the signals at both input terminals of the gate are low and the output is once more low. During the interval $t_3$ to $t_4$, the signal at input terminal 22 is high and that at terminal 24 low causing the output at terminal 20 to be high. During the interval $t_4$ to $t_5$, the signals at terminals 22 and 24 are both high causing the output of the gate to be low. During the interval $t_5$ to $t_6$, the signal at terminal 22 is high, the signal at terminal 24 is low and the output of the gate is high.

In the present embodiment, the input signal is assumed to be of constant amplitude. This would be the case for an FM wave that has had its amplitude variations removed by a limiter (not shown). If the amplitude of the input signal is not constant, the signal shown at D of FIG. 4 may not be of the proper pulse width. This could lead to errors in the output waveform such as a duty cycle that is not 50 percent.

Another potential source of error in the circuit of FIG. 1 is a variation in the threshold level of detector 16. Such a variation could arise because of variations in the system power supply, temperature variations or the aging of components. A threshold variation would cause a deviation of the output duty cycle in a manner similar to that caused by variations in the amplitude of the input signal.

The circuit of FIG. 1 may be modified to compensate for variations caused by the above described error sources. In such a modified circuit, the duty cycle of the output waveform is sensed. If it becomes more or less than 50 percent, an error signal is generated. This signal is used to modify the threshold voltage of the detector to cause the duty cycle of the output signal to return to its desired value. The above modification to the circuit of FIG. 1 may also be used in the embodiments to be described below.

FIG. 2 shows a second embodiment of the invention. A signal is applied at input terminal 26 to the primary winding of transformer 28. One end of the secondary winding of transformer 28 is connected to the input terminals of threshold detector 32 and wave shaper 30. The other end of the secondary winding is connected to the input terminal of threshold detector 34. The center tap of the secondary winding is connected to ground. The threshold detectors 32 and 34 are connected to the respective input terminals of OR gate 36. The outputs of gate 36 and wave shaper 30 are applied to terminals 44 and 42, respectively, of the EXCLUSIVE OR gate 38. The output terminal of the EXCLUSIVE OR gate comprises the circuit output terminal 40.

In the operation of the circuit of FIG. 2, an input signal applied at 26 and shown at F of FIG. 5, is coupled to the secondary of transformer 28 and applied to the wave shaper 30. The output of the shaper is a square wave shown at G of FIG. 5. The input signal is also coupled to threshold detectors 32 and 34. The threshold of each detector is a fixed voltage whose value is $\sqrt{3}/2$ times the peak value of the secondary voltage. Each detector will produce a single pulse for each cycle of input voltage whenever the amplitude of this pulse exceeds the threshold value.

Because the signals applied to the respective threshold detectors are of opposite polarity, the pulse train produced by detector 32 and shown at H of FIG. 5, will be displaced in time from the pulse train produced by detector 34, shown at I of FIG. 5, by 180°. These two pulse trains are combined into a single pulse train J by OR gate 36. This pulse train is shown at J of FIG. 5, and it is substantially identical to the pulse train shown at D of FIG. 4. The outputs of OR gate 36 and wave shaper 30 are applied to EXCLUSIVE OR gate 38. The output of gate 38 is a signal at K of FIG. 5 that is three times the frequency of the signal applied at input terminal 26. Frequency multiplication occurs in a manner identical to that described in the operation of the circuit of FIG. 1.

The principal advantage of the circuit of FIG. 2 over the circuit of FIG. 1 is the elimination of full wave rectifier 14. It may be desirable to eliminate the rectifier circuit when very high frequency operation of the multiplier circuit is desired because, in practice, rectifier circuits often are limited in their frequency response. While the circuit of FIG. 2 derives two signals, one being 180° out-of-phase with respect to the other, by use of a transformer, the signals may be derived by other phase splitting means known in the art. For example, a common emitter transistor amplifier having equal collector and emitter load impedances could be used. Such a circuit would provide two signals, the first obtained at the collector electrode and the second obtained at the emitter electrode, having substantially equal amplitudes and the required 180° phase shift with respect to each other.

The concepts presented in the discussion of the operation of the circuits of FIGS. 1 and 2 can be extended to achieve frequency multiplication by any odd integer. FIG. 3 is a block diagram of a multiplier whose output frequency is five times the input frequency. Elements common to the circuits of FIGS. 1 and 3 are identified by the same reference numbers. The circuit of FIG. 1 is modified by the connection of threshold detector 50 to the output terminal of rectifier 14. The outputs of EXCLUSIVE OR gate 18 and detector 50 are connected to EXCLUSIVE OR gate 52. The signal output terminal 54 is the output terminal of gate 52.

In the operation of the circuit of FIG. 3, a sinusoidal signal applied to terminal 10 is converted to a square wave of the same frequency by wave shaper 12. The input signal is also applied to full wave rectifier 14. The rectifier output is applied to threshold detector 16. The threshold is set to produce an output pulse over the 36°–144° portions of each half of the rectified wave. This means that the threshold is set to 0.588 times the peak value of the rectified wave, where 0.588 represents the sine of 36°. The outputs of wave shaper 12 and detector 16, shown at L and M, respectively, of FIG. 6, are applied to EXCLUSIVE OR gate 18.

The output of rectifier 14 is also applied to threshold detector 50. The threshold of this detector is set to produce a pulse that is 36° wide out of each 180° of the rectified wave. This pulse is centered about the peak of each rectified half wave, thus having a range of 72° to 108°. The threshold is set to 0.951 times the peak value of the rectified wave where 0.951 represents the sine of 72°. The outputs of gate 18 and detector 50, shown at N and O, respectively, of FIG. 6 are applied to EXCLUSIVE OR gate 52. The output of gate 52, shown at P of FIG. 6, is a pulse train whose frequency is five times the frequency of the input signal.

The circuit of FIG. 2 may also be modified to achieve frequency multiplication by a factor of 5. A third and fourth threshold detector, a second OR gate and a second EXCLUSIVE OR gate would be required.

Additional threshold detectors and logic gates may be added to the circuit of FIG. 3 to achieve multiplication by factors greater than 5. For example, an additional threshold detector and EXCLUSIVE OR gate would be required to realize a multiplication factor of 7. While in theory the disclosed concept may be extended to achieve multiplication by any odd factor, a practical limit may arise because of the limitations of the circuits needed to implement the concept.

The output signals produced by the circuits of FIGS. 1, 2 and 3 are square waves, while the input signal in each case is a sinusoid. If it is desired to convert the output signal into a sinusoid, this can be easily accomplished through the use of a relatively broad band, low pass filter. The input signal wave form is not confined to sinusoids. The multiplier circuits will operate properly with any input signal having, or which can be made to have, a finite, non-zero slope if the signal has symmetrical rise and fall times.

What is claimed is:

1. A circuit for producing an output signal whose frequency is N times the frequency of its input signal, where N is an odd integer, comprising, in combination:

first means responsive to said input signal for producing a square wave of the same frequency as said input signal and which swings between two levels, one representing one binary value and the other the other binary value;

second means responsive to said input signal for producing an output wave at a level representing one binary value when the amplitude of said input signal is greater than a given threshold level and at a level representing the other binary value whenever the amplitude of said input signal is less than said given threshold level; and logic circuit means responsive to said square wave and said output wave for producing an output signal at one level when the two waves represent the same binary value and at a second level when said two waves represent different binary values.

2. The combination recited in claim 1 where said input signal is sinusoidal, N equals three and said threshold level equals ( $\sqrt{3}/2$) times the value of the input signal peak voltage.

3. The combination recited in claim 1 where said first means comprises a Schmitt trigger bistable circuit.

4. The combination recited in claim 1 where said first means comprises a high gain limiting amplifier.

5. The combination recited in claim 1 where said logic circuit means comprises an EXCLUSIVE OR logic gate.

6. The combination recited in claim 1 where said second means comprises, in combination:

a full wave rectifier for producing a signal at twice the frequency of said input signal; and a threshold detector connected between said rectifier and said logic circuit means.

7. The combination recited in claim 1 wherein said second means comprises, in combination:

a transformer having a primary winding and a center-tap secondary winding, said input signal connected to said primary winding and said center-tap connected to a reference potential;

a first threshold detector connected to one end of said secondary winding, said detector producing a first wave at a level representing one binary value when the amplitude of said input signal is greater than a given threshold level and at a level representing the other binary value whenever the amplitude of said input signal is less than said given threshold level;

a second threshold detector connected to the other end of said secondary winding, said second detector producing a second wave at a level representing one binary value when the amplitude of said input signal is greater than said threshold level and at a level representing the other binary value whenever the amplitude of said second detector input signal is less than said threshold level; and second logic circuit means responsive to said first and second waves for producing an output signal at one level whenever at least one of said first and second waves is at a level representing a given binary value and at a second level otherwise.

8. The circuit of claim 6 further including:

third means responsive to said full wave rectifier output for producing an output wave at a level representing one binary value when the amplitude of said rectifier output is greater than a second threshold level and at a level representing the other binary value whenever the amplitude of said rectifier output is less than said second threshold level; and third logic circuit means responsive to said third means output and said logic circuit means for producing an output signal at one level when the two input waves represent the same binary value and at a second level when said two waves represent different binary values.

9. The circuit of claim 8 where said input signal is sinusoidal, N equals five and said threshold level equals 0.588 times the value of the input signal peak voltage.

10. The circuit of claim 9 where said second threshold level equals 0.951 times the value of the input signal peak voltage.

11. A circuit for translating an input alternating signal, whose frequency may be variable, to an output alternating signal at a frequency N times that of the input signal, where N is a positive, odd integer, comprising in combination:

first means for deriving from said input signal a symmetrical output wave of the same frequency as said input signal, the value of said output wave being at a level representing a first binary value whenever said input signal is positive relative to the average direct current level of said input signal and at a second level representing the other binary value whenever said input signal is negative relative to its said average direct current level;

second means for deriving from said input signal M asymmetrical output pulse waves, each at double the frequency of the input signal, where M equals (N−1)/2, each wave being at a first binary value during each pulse interval and at the other binary value otherwise, where the width in electrical degrees of each pulse in each wave equals P (180°/N), where P is a different odd integer, of successively higher value, starting with one for each of the M waves; and third means responsive to said first and second means and having M+1 input terminals for producing a voltage at a first level whenever an odd number of the M+1 input signals are at a level representing said binary value and a second level whenever an even number of the M+1 input signals are at a level representing said binary value.

12. A circuit for translating an input alternating signal, whose frequency may be variable, to an output alternating signal at a frequency three times that of the input signal, comprising in combination:

first means for deriving from said input signal a symmetrical output wave of the same frequency as said input signal and which has a level representing one binary value when the input signal is more positive than its direct current level and a level representing the other binary value when the input signal is more negative than said direct current level;

second means for deriving from said input signal an asymmetrical output wave at double the frequency of the input signal and which has a level representing one binary value for one third of each period and a level representing the other binary value for the remainder of each period; and third means responsive to said first and second means for producing an output signal at one level when said symmetrical and asymmetrical waves are at the same binary value and at a second level when said symmetrical and asymmetrical waves are at different binary values.

13. A circuit for translating an input alternating signal, whose frequency may be variable, to an output alternating signal at a frequency N times that of the input signal, where N is a positive odd integer, comprising in combination:

first means for deriving from said input signal a symmetrical output wave of the same frequency as said input signal and which has a level representing one binary value when the input signal is more positive than its direct current level and a level representing the other binary value when the input signal is more negative than said direct current level;

second means for deriving from said input signal M asymmetrical output waves, where M equals (N−1)/2, at double the frequency of the input signal where each wave has a level representing one binary value for the smaller fraction of each cycle and a level representing the other binary value for the larger fraction of each cycle; and third means responsive to said first and second means for producing a signal at one level when an even number of said symmetrical and asymmetrical output waves are at the same binary value and at a second level when an odd number of said output waves are at said same binary value.

* * * * *